UNITED STATES PATENT OFFICE.

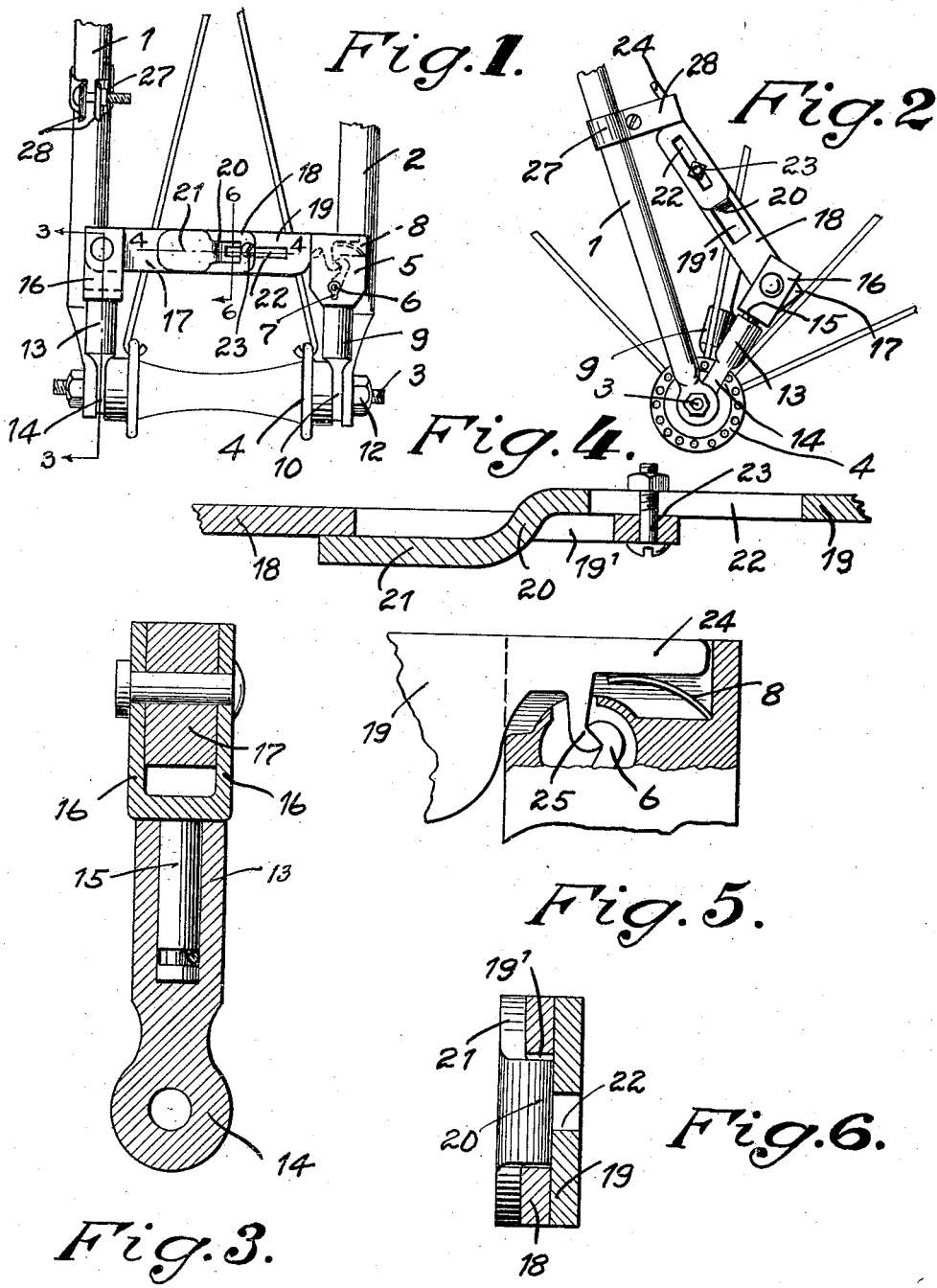

GEORGE A. YAECK, OF DECATUR, ILLINOIS.

BICYCLE-LOCK.

1,082,616. Specification of Letters Patent. Patented Dec. 30, 1913.

Application filed May 28, 1913. Serial No. 770,499.

*To all whom it may concern:*

Be it known that I, GEORGE A. YAECK, a citizen of the United States, residing at Decatur, in the county of Macon, State of Illinois, have invented certain new and useful Improvements in Bicycle-Locks; and I do hereby declare the following to be a full, clear, and exact description of the invention, such as will enable others skilled in the art to which it appertains to make and use the same.

The present invention is directed to improvements in locks particularly designed for use in connection with bicycles.

The invention has for its object to provide and improve devices of this type by which the wheels of a bicycle may be locked to the frame.

A further object of the invention is to provide an improved construction of this type which is permanently connected to the frame of the bicycle when in its locked or unlocked position.

With these and other objects in view, this invention resides in the novel features of construction, formation, combination and arrangement of parts to be hereinafter more fully described, claimed and illustrated in the accompanying drawing, in which:—

Figure 1 is a front elevation of the front forks of the bicycle showing the lock in its operative position. Fig. 2 is a similar view showing the same in its unlocked position. Fig. 3 is a sectional view on line 3—3 of Fig. 1. Fig. 4 is a similar view on line 4—4 of Fig. 1. Fig. 5 is a vertical sectional view through the casing. Fig. 6 is a similar view on line 6—6 of Fig. 1.

Referring to the drawing, the numerals 1 and 2 designate the forks of a bicycle, the same being of the usual construction and support at their lower ends the axle 3 upon which the wheel 4 rotates.

The lock comprises a casing 5, in which is mounted the locking mechanism 6, the same being operated upon the insertion of a key in the key hole 7, which is formed in one side of the casing 5. Mounted in the casing 5 and above the locking mechanism 6 is a leaf spring 8, the purpose of which will appear later. The lower end of the casing 5 has formed integral therewith an arm 9, the same being provided at its lower end with a perforated plate 10 for engagement with one end of the axle 3 so that the clamping nut 12 will serve to hold the casing fixed in proper position. The socket member 13 has its lower end provided with a plate 14, the same being perforated for engagement with the other end of the axle 3, and in the same manner as the before mentioned plate. Swiveled in the socket member 13 is a stem 15, the upper end of which is provided with furcations 16, and between which one end of the locking bar 17 is pivotally connected.

The locking bar 17 is formed from sections 18 and 19, the former being provided with a longitudinal slot 19' which is engaged by the offset 20 formed upon one end of the section 19, said off-set terminating in a plate 21 which engages one side of the section 18 so as to prevent disengagement of the off-set 20 from the slot 19'. The section 19 is also provided with a longitudinal slot 22, which is engaged by the clamping bolt 23 carried by the section 18, said clamping bolt serving to hold the sections 18 and 19 together, and at the same time permitting the sections to be adjusted to fit bicycles having forks spaced at different distances. The other end of the section 19 terminates in an extension 24, which has formed integral therewith a hook 25 which is adapted to be engaged by the locking mechanism 6, and at which time the extension 24 compresses the spring 8 so that when the locking mechanism is operated to release the catch 25, said spring will force the extension from engagement with the casing. Connected to the fork 1 is a clip 27, the same being provided with resilient jaws 28, the purpose of which will appear later.

It is obvious that the lock can be used upon motorcycles, and that the same can be applied to the front or rear forks as desired.

In operation the locking bar is swung upon its pivot into a horizontal position between the spokes of the wheel, and the catch engaged with the locking mechanism, thus locking the bicycle. When it is desired to unlock the bar a key is inserted in the key hole, and the catch released, whereupon the bar is swung upwardly and from engagement between the spokes, whereupon the same is turned with the swiveled connected stem so that the locking bar can be engaged between the resilient jaws 28, thus holding the bar in its unlocked position.

What is claimed is:—

1. A bicycle lock comprising a casing having a locking mechanism contained therein, means for connecting the casing to the wheel axle of the bicycle, a socket member connected to the outer end of the axle, a stem swiveled in the socket member, said stem having furcations formed upon its upper end, a locking bar pivoted between the furcations, said locking bar consisting of adjustably connected sections, one of said sections having a catch for engaging the locking mechanism in said casing.

2. A bicycle lock comprising a casing, a locking mechanism contained in the casing, means for connecting the casing to one end of the wheel axle, a socket member connected to the other end of the wheel axle, a stem swiveled in the socket member, furcations formed upon the upper end of the stem, a locking bar pivoted between the furcations, said locking bar consisting of sections, one of said sections having a slot formed therein, an off-set formed upon the other section for slidably engaging said slot, a catch carried by one of the sections for engaging the locking mechanism, and means for holding the sections adjustably connected.

In testimony whereof, I affix my signature, in the presence of two witnesses.

GEORGE A. YAECK.

Witnesses:
 RUPEMMA KNIGHT,
 EDWARD C. BURG.

Copies of this patent may be obtained for five cents each, by addressing the "Commissioner of Patents, Washington, D. C."